March 18, 1969  L. A. WOOLLEY  3,432,925
METHOD OF SECURING A RIVET CONTACT IN AN APERTURE
OF AN ELECTRICAL ELEMENT
Filed Oct. 14, 1966
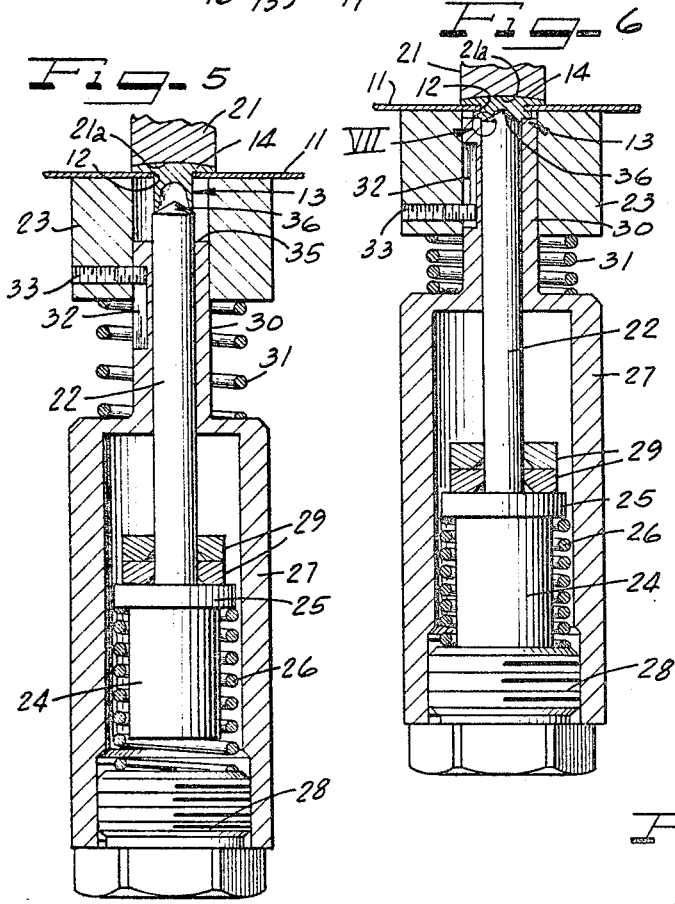
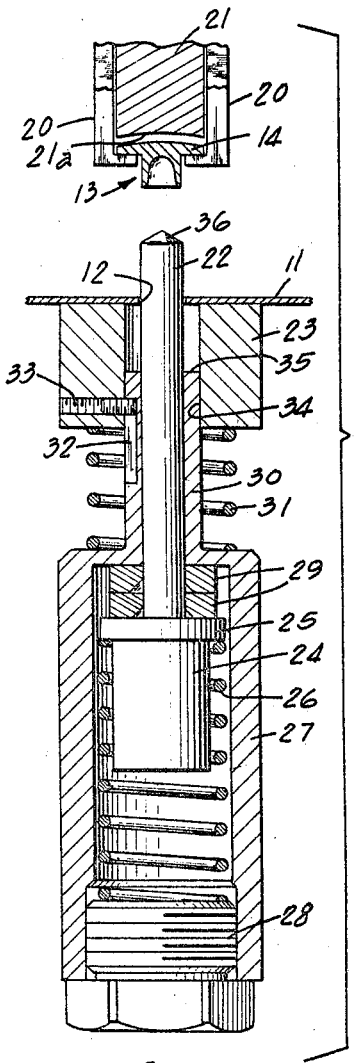
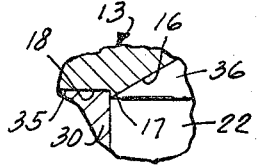
INVENTOR.
LEE A. WOOLLEY
BY *Hill, Sherman, Meroni, Gross & Simpson*  ATTORNEYS

United States Patent Office 3,432,925
Patented Mar. 18, 1969

3,432,925
METHOD OF SECURING A RIVET CONTACT IN AN APERTURE OF AN ELECTRICAL ELEMENT
Lee A. Woolley, Kokomo, Ind., assignor, by mesne assignments, to The Scott & Fetzer Company, Lakewood, Ohio, a corporation of Ohio
Filed Oct. 14, 1966, Ser. No. 586,846
U.S. Cl. 29—630     3 Claims
Int. Cl. H01r 9/00

This invention relates to improvements in the attachment of a rivet contact to an electrical element such as a blade. In the past tubular shank rivets, as contacts for electrical blades, have been preferred over solid shank rivets because of the use of lesser amounts of material and consequent lesser cost. Tubular shank rivets, however, have had certain disadvantages in being attached to the electrical element or blade due to such things as poorer electrical contact with the blade, buckling of the blade, cracking, maintenance of the tools, etc. These disadvantages become particularly of moment when the rivet is composed of relatively hard metal such as silver cadmium oxide.

An object, therefore, is to provide a method of forming an electrical element or blade with a shank type rivet contact so attached as to overcome some of the previous problems and disadvantages.

Further, an important object of the invention is to provide a method of forming an electrical element or blade with a staked contact that results in improved electrical qualities in the article.

In accordance with the general features of this invention, there is provided an improved method of attaching a tubular shank rivet to an electrical element wherein the electrical element has an aperture of a size to receive the shank of a rivet to be interlocked therewith with the head of the rivet overlapping the edge of the aperture on one side of the electrical element, and wherein the end of the rivet shank portion is staked to the other side of the element, such staked portion being centrally recessed opposite the aperture and at least partially defined by a metal flow controlling shoulder slightly inset endwise toward the element and generally in axial alignment with the aperture and with the staked portion molded against the interior wall of the aperture into pressure contact therewith and flaring radially outwardly between the aperture and the shoulder in tight engagement with such other side of the element.

Still other features of the invention relate, in the attachment of the contact rivet to the blade, to the use of an anvil for staking the end of the rivet shank to the element or blade arranged to be disposed closer to the element than the base of a pointed or conical end of a central pilot rod aligned with the blade aperture and bearing on the end of the shank of the rivet.

Other objects and features of this invention will more fully appear from the following detailed description taken in connection with the accompanying drawings which illustrate a single embodiment of the invention and wherein:

FIGURE 1 is a fragmentary cross-sectional view, partly in elevation, of a prior art solid type rivet applied to a blade;

FIGURE 2 is a fragmentary cross-sectional view of a prior art tubular shank type rivet staked to a blade and showing the loose fit in the aperture of the blade;

FIGURE 3 is a fragmentary cross-sectional view similar to FIGURE 2 illustrating a tubular rivet attached to an electrical element or blade in accordance with the improvements of this invention;

FIGURE 4 is a vertical cross-sectional view, partly in elevation, showing mechanism for staking a tubular rivet to an electrical element or blade;

FIGURE 5 is a cross-sectional view similar to FIGURE 4 showing the shank of the rivet inserted in the blade and in cooperation with an end of a pilot rod prior to the application of the anvil;

FIGURE 6 is a vertical cross-sectional view similar to FIGURE 5 showing the manner in which the anvil moves closer to the blade than the base of the conical end of the pilot rod for staking the rivet; and FIGURE 7 is an enlarged fragmentary cross-sectional view of the encircled portion in FIGURE 6.

As shown on the drawings:

In FIGURES 1 and 2, for purposes of comparison with my present invention, there are illustrated prior forms of rivet type contacts secured to electrical elements or blades.

The form shown in FIGURE 1 involves an electrical element or metal blade 1 having an aperture or hole 2 through which projects the shank of a rivet 3 having a head or contact 4 overlying the edge of the aperture and having a staked portion 5 riveted to the other side of the element 1. It will be appreciated that with this solid type of contact, which is usually made of a silver alloy composition, more material is used in the rivet thus adding to the cost of the article. In all forms, the electrical blade 1 may be made from any suitable springy metal material.

In the form of FIGURE 2, the blade 6 has an aperture 7 through which the shank of a tubular rivet 8 extends. This rivet has a contact head 9 overlappng the edge of the aperture 7 on one side of the blade or element 6 and a staked or riveted portion 10 overlapping the other side. While this form is more economical to make, due to lesser material being present in a tubular shank rivet, it has certain disadvantages noted before. One of the principal disadvantages is the looseness of fit of the rivet shank in the aperture 7 resulting in poor electrical contact. This is occasioned by the rolling or flowing of the thin metal wall of the shank away from the aperture. Also, with this type of fastening there is a tendency for the blade to buckle at the aperture.

In FIGURE 3, there is illustrated my new article of manufacture wherein a tubular rivet is secured in place in accordance with the features of this invention. Here, the electrical element or blade 11 has an aperture 12 through which the tubular shank of the rivet 13 extends with the contact or head 14 overlying the edge of the aperture on one side of the element 11. In this form, the flow of the metal in the cold working or staking operation is so controlled that the rivet shank tightly fits the aperture 12 so as to have good electrical contact therewith. The staked portion 15 has a central indentation 16 shaped in part by the pilot rod (to be described hereinafter) and is defined by a shoulder 17 surrounded by an anvil flattened portion 18 tightly pressed against the margin of the blade around the aperture 12. Actually, the forming of the shoulder 17, as shall become apparent hereinafter, controls the flow of the metal so that there is less tendency for it to roll away or out of contact with the inner wall of blade aperture 12.

Now I shall proceed to describe an apparatus for staking the tubular shank rivet in position as shown in FIGURE 3; and it is believed that the novel method involved will be apparent from a description of the apparatus. This apparatus is illustrated in FIGURES 4–7.

Referring first to FIGURE 4, it will be observed that a tubular shank rivet 13 has its head 14 engaged and held in position for the subsequent operations by spaced conventional fingers or jaws 20—20. A cylindrical ram 21, having a concave end 21a conformed to the curved top shape of the rivet head 14, is moved down into engagement with the rivet head 14 to drive the head toward the upper end of a pilot rod 22 which extends upwardly through the aperture 12 in the electrical element or blade 11 carried on an annular supporting member 23.

The other and lower end of the cylindrical pilot rod 22 is enlarged at 24 and has an annular shoulder 25 engaged by the upper end of an expansion spring 26 inside of a fixed cylindrical housing 27, the lower end of which is closed by a threaded nut 28. This housing 27 may be fixedly and firmly supported in any suitable manner. Also, the lower end of the spring 26 contacts the inner end of the nut 28 and, as is well-known in the art, the force of the spring may be varied by varying the position of the threaded nut 28.

Disposed above the pilot rod shoulder 25 are a pair of stop washers 29 of any suitable construction for abutting the upper end of the housing 27. It will be appreciated that the spring 26 has been previously calibrated in accordance with the spring resiliency desired. This is also true of the upper spring 31.

Projecting upwardly and integral with the housing 27 is a tubular extension 30 which extends into the blade supporting ring 23 and has surrounding it the expansion spring 31 disposed between the housing 27 and the underside of the ring 23. The tubular extension 30 has a key-way slot 32 in which is received an end of a pin 33 threaded transversely through a lower portion of the supporting ring 23. This pin holds the parts together, but permits a limited amount of longitudinal travel of the supporting ring downwardly about the pilot rod as shown in FIGURES 5 and 6.

The upper end of the tubular end of the tubular extension 30 inside of the blade supporting ring 23 has a flat anvil surface 35. Also, it should be noted that the upper end of the pilot rod 22 has a predetermined conical point 36, the location of which is important as shall be described more in detail in connection with FIGURES 6 and 7.

The ram 21 moves the jaw supported rivet 13 downwardly against the conical point 36 on the pilot rod 22, and after the shank of the rivet enters the aperture 12 in the blade the jaws or fingers 20—20 are automatically removed in any suitable manner. Continued downward movement of the ram 21 brings the head of the rivet 14 into contact with the top surface of the blade or element 11 (FIG. 5). In the process of this movement, the pilot rod 22 is pushed downwardly inside of the housing 27 compressing the spring 26. Thereafter, continued downward movement of the ram 21 compresses the spring 31 permitting the anvil end 35 of the extension 30 to move upwardly inside of the blade supporting ring 23.

As the ram moves down the circular end of the rivet shank is caused to flow outwardly radially, and upon striking the flat anvil surface 35 is provided with the flow controlling shoulder 17 (FIGURES 6 and 7) which concentrates the material in the locale of the blade aperture 12 so as to prevent the rivet material from rolling out of contact with the edge of the aperture. The conical point 36 shapes the center of the staked portion at 16 and the flat anvil provides the radially outwardly extending anvil portion 18 overlapping the underside of the edge of the blade aperture 12.

The important feature of this invention relates to the relative locations of the base of the conical pilot point 36 and the anvil surface 35 upon the conclusion of the ram stroke. As best shown in FIGURE 7, the base of the pilot point is lower down or is located further away from the underside of the blade than the flat anvil surface 35 so that the material of the tubular shank is of necessity shouldered at 17 therebetween. This prevents any tendency of the rivet shank to roll over as in standard tubular riveting. It will be further appreciated that as the stroke of the ram or driver is completed the shank is further compressed tightly filling the aperture in the blade as the anvil engaged portion 18 is upset toward the blade. In reality, the material of the tubular shank is molded to conform tightly to the interior surface of the wall defining the blade aperture 12 thus having a pressure contact therewith.

Advantageous results of this new way of attaching the tubular rivet to the blade are briefly as follows:

(1) A solid rivet shank type contact is made with the internal wall of the aperture in the blade.

(2) Buckling of the blade at the aperture is substantially eliminated.

(3) Tighter or pressure contact is enabled between the blade and the staked portion of the rivet shank.

(4) The elimination of the rollover minimizes cracking out of the staked portion.

(5) Greater life of the tools used, and particularly of the anvil, is made possible.

(6) Reconditioning of the anvil is much easier than is the case where a complex shape is employed in the roll type anvil and the pilot of previous structures.

Referring again to FIGURE 7, it has been found that the distance separating the anvil surface 35 and the base of the conical point 36 can be of the order of $\frac{1}{5000}$ to $\frac{5}{1000}$ of an inch, although usually several thousandths is adequate.

It has also been determined that with this improved attachment of the tubular rivet to the blade, where an alloy such as silver cadmium oxide is used in the rivet, it is possible to so increase the electrical contact with the blade that the ensuing structure can pass electrical tests employing as much as one-half horsepower as distinguished from around one-third horsepower in the past. Further, not only are the electrical qualities improved, but it is possible to save as much as 11% in cost over previous constructions. This does not take into consideration losses heretofore encountered due to rejects from radial cracking and cupping or buckling of the blade. Needless to say, where the blade buckles the electrical effectiveness of the contact is quite likely to be diminished.

Although minor modifications might be suggested by those versed in the art, it should be understood that I wish to embody within the scope of the patent warranted thereon, all such embodiments as reasonably and properly come within the scope of my contribution to the art.

I claim as my invention:

1. In a method of securing in an aperture of an electrical element a contact comprising a rivet having a head on one side of the element and a depending recessed shank portion for projection through the aperture to the outer side of the element, the steps of:

piloting the rivet shank through the aperture,
ramming the rivet endwise to compress and radially outwardly flow the material of said shank and form a metal flow controlling annular shoulder inset toward and generally aligned with the aperture wall, and
squashing the radially outwardly flowed material inwardly between the shoulder and the aperture to mold it into pressure contact with the interior wall of the aperture and with the excess material being flowed radially outwardly from the inset shoulder about the aperture and flattened in contact with said other side of said element.

2. The method of claim 1 further characterized by the ramming operation including an anvil flattening of the shank material to a plane generally aligned with the bottom of the inset shoulder.

3. The method of claim 1 further characterized by the piloting step comprising the pilot contacting of the inner edge of tubular shank at the general locale of said shoulder, and by said squashing step comprising the anvil shaping of the material in plane closer to said blade than the outer edge of said shoulder and so that material of the shank is stressed at and tightly held in the aperture.

References Cited

UNITED STATES PATENTS

| | | | |
|---|---|---|---|
| 2,260,149 | 10/1941 | Meek | 29—512 X |
| 2,347,219 | 4/1944 | Schnell. | |
| 2,465,534 | 3/1949 | Havener. | |
| 2,746,633 | 5/1956 | Simmons. | |
| 2,564,782 | 8/1951 | Franz. | |
| 3,039,798 | 6/1962 | Carlson et al. | |
| 3,200,226 | 8/1965 | Cooley. | |

CHARLIE T. MOON, *Primary Examiner.*

U.S. Cl. X.R.

29—203, 243.54, 512, 522; 200—166